(12) United States Patent
Kramer

(10) Patent No.: US 6,837,263 B2
(45) Date of Patent: Jan. 4, 2005

(54) LIQUID LEVEL CONTROL SYSTEM

(75) Inventor: Richard H. Kramer, Bowling Green, OH (US)

(73) Assignee: DistaView Corporation, Bowling Green, OH (US)

(*) Notice: Subject to any disclaimer, the term of this patent is extended or adjusted under 35 U.S.C. 154(b) by 278 days.

(21) Appl. No.: 10/039,861

(22) Filed: Oct. 20, 2001

(65) Prior Publication Data

US 2002/0078995 A1 Jun. 27, 2002

Related U.S. Application Data

(60) Provisional application No. 60/241,788, filed on Oct. 20, 2000.

(51) Int. Cl.[7] .......................... F16K 21/18; F16K 21/20; G05D 9/04; G05D 16/06
(52) U.S. Cl. ........................ 137/414; 73/299; 92/103 F; 137/386; 137/393; 137/893; 137/895; 141/198; 251/61.1; 251/61.2
(58) Field of Search ................... 137/82, 386, 393, 137/395, 414, 893, 895; 73/299; 251/61.1, 61.2, 331, 335.2; 92/103 F; 141/198

(56) References Cited

U.S. PATENT DOCUMENTS

| 2,988,099 | A | * | 6/1961 | Langhans | 137/82 |
|---|---|---|---|---|---|
| 3,105,508 | A | * | 10/1963 | Bowditch et al. | 137/82 |
| 3,208,721 | A | * | 9/1965 | McHugh | 251/331 |
| 3,320,970 | A | * | 5/1967 | McHenry | 137/414 |
| 3,360,002 | A | * | 12/1967 | Weis et al. | 137/395 |
| 3,470,902 | A | * | 10/1969 | Hackman | 137/386 |
| 3,645,293 | A | * | 2/1972 | Pedersen | 137/82 |
| 3,734,117 | A | * | 5/1973 | Atkinson | 137/82 |
| 3,861,642 | A | * | 1/1975 | Maddocks | 251/61.1 |
| 3,929,148 | A | * | 12/1975 | Midy | 137/82 |
| 4,148,334 | A | * | 4/1979 | Richards | 137/393 |
| 4,161,188 | A | * | 7/1979 | Jorgensen | 137/386 |
| 4,188,977 | A | | 2/1980 | Laakaniemi et al. | |
| 4,207,914 | A | | 6/1980 | Holloway et al. | |
| 4,208,031 | A | * | 6/1980 | Jonak | 92/103 F |
| 4,211,249 | A | * | 7/1980 | Richards | 137/393 |
| 4,295,631 | A | * | 10/1981 | Allen | 92/103 F |
| 4,314,578 | A | | 2/1982 | Lederman | |
| 4,327,891 | A | * | 5/1982 | Allen et al. | 92/103 F |
| 4,345,618 | A | * | 8/1982 | Altman et al. | 137/393 |
| 4,603,709 | A | * | 8/1986 | Huisma | 137/393 |
| 4,684,106 | A | * | 8/1987 | Kolenc et al. | 251/335.2 |
| 5,309,764 | A | | 5/1994 | Waldrop et al. | |
| 5,474,685 | A | | 12/1995 | Breslin | |
| 5,490,659 | A | * | 2/1996 | Whiteside | 92/103 F |
| 6,123,765 | A | * | 9/2000 | Sinha et al. | 137/386 |

* cited by examiner

Primary Examiner—George L. Walton
(74) Attorney, Agent, or Firm—Fraser Martin Buchanan Miller LLC; Donald R. Fraser

(57) ABSTRACT

A liquid level control system including a tank; a source of liquid in communication with the tank; a pressure fluid actuated valve for controlling the flow of liquid to the tank from the source; a pressure sensor disposed in the tank to monitor the hydrostatic pressure determined by the quantity of liquid in the tank. A source of pressure fluid is provided which is normally vented to the atmosphere. A pressure fluid amplifier is coupled to the pressure fluid actuated valve and to the source of pressure fluid. When the pressure sensor sensed an increase of pressure caused by an increase in the liquid level in the tank, the pressure fluid amplifier is effective to actuate the valve to close and militate against flowing into the tank to maintain the liquid at a predetermined level.

20 Claims, 2 Drawing Sheets

LIQUID LEVEL CONTROL SYSTEM

CROSS-REFERENCE TO RELATED APPLICATION

This application claims the benefit of U.S. provisional patent application Ser. No. 60/241,788 filed Oct. 20, 2000.

BACKGROUND OF THE INVENTION

1. Field of the Invention

The present invention relates to a liquid level control system and more particularly to a bubbler operated proportional valve to proportionally control the level of liquid in a reservoir.

2. Description of the Prior Art

The prior art discloses various control systems having electrical components for determining and maintaining the liquid level in an associated system. Such systems cannot be safely utilized for controlling materials that are explosive; where the temperatures of the materials are outside the operational tolerances of the sensors or other parameters of the system; and where the systems to be controlled involve liquids containing suspended particles, slurry, high viscosity, or chemical components that would render the associated electrical or electronic sensing parameters inoperable.

Therefore, there is a need for a liquid level control systems capable of operating with various liquids heretofore considered dangerous or otherwise difficult to control while maintaining a reliable, cost effective, and durable system.

SUMMARY OF THE INVENTION

It is an object of the present invention to produce a control system for maintaining the liquid level in a vessel or tank without the use of electrically operated sensors, valves, solenoids, pump, or motors.

The above object, as well as others, may be achieved by a liquid level control system comprising:

a tank;

a source of liquid in communication with the tank;

a pressure fluid actuated valve for controlling the flow of liquid to the tank from the source;

a hydrostatic pressure sensor including a conduit having one end submersed in the liquid in the tank and the other end extending outwardly of the tank;

a source of pressure fluid; and a pressure fluid amplifier having a pressure fluid outlet coupled to the pressure fluid actuated valve for controlling the flow of liquid from the source, a first inlet coupled to the source of pressure fluid, a second inlet coupled to the other end of the conduit of the pressure sensor, a vent, and a diaphragm normally maintaining flow of pressure fluid between the first inlet and the vent wherein when the second inlet senses a decrease of pressure in the conduit, the diaphragm is caused to block the flow of pressure fluid from the first inlet to the vent and direct the pressure fluid to flow to the pressure fluid activated valve from the outlet.

BRIEF DESCRIPTION OF THE DRAWINGS

The above objects and advantages of the invention will become clearly apparent to those skilled in the art from reading the following detailed description of a preferred embodiment of the invention when considered in the light of the accompanying drawings, in which.

DETAILED DESCRIPTION OF THE PREFERRED EMBODIMENT

Figure 1:
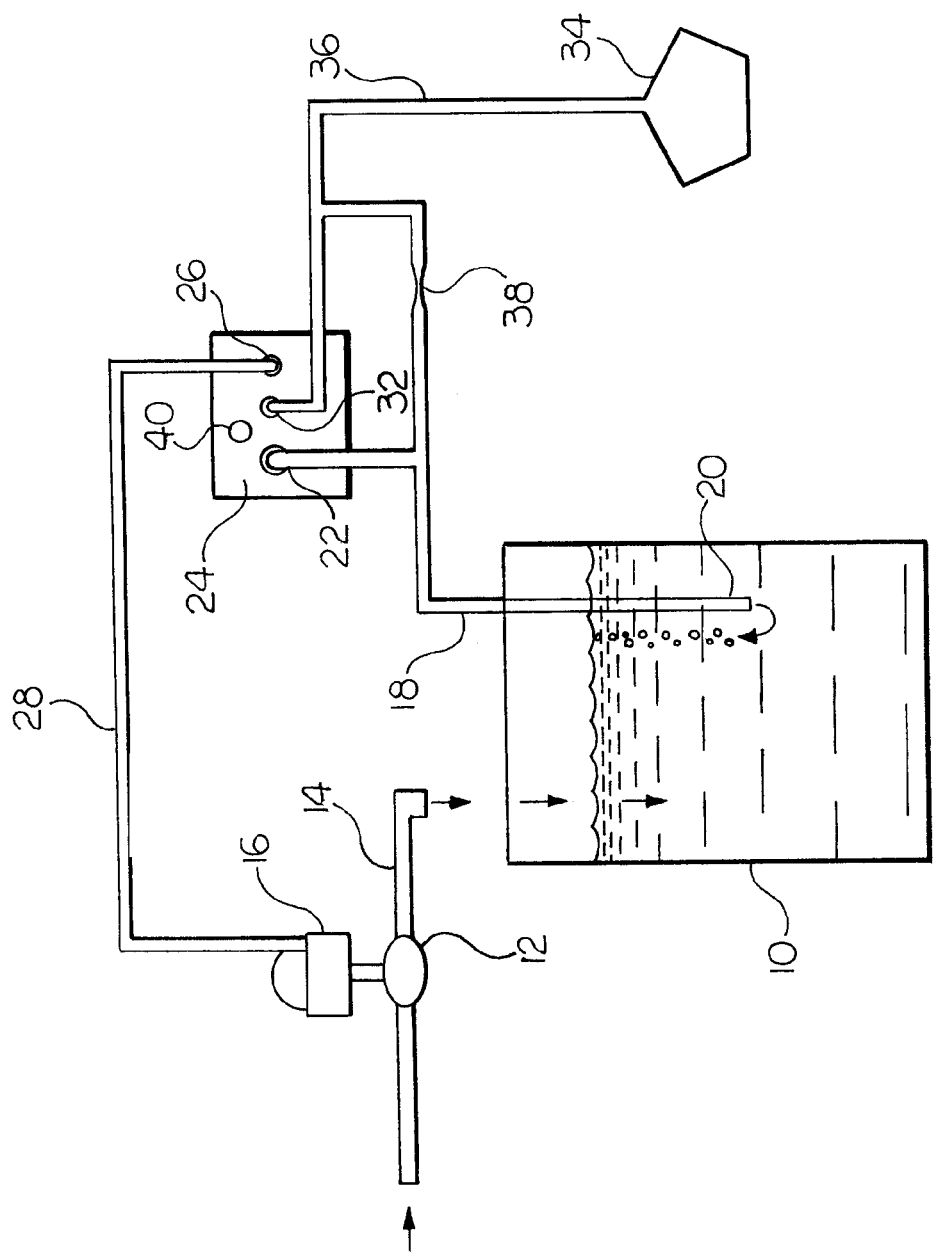
FIG. 1 is a schematic drawing of the control system embodying the invention.

Referring to the drawings, there is illustrated a liquid level control system for controlling the level of a liquid in the vessel or tank 10. Liquid may be introduced into the tank 10 from a source through a pneumatically actuated valve 12 and an associated input line 14. The pneumatically actuated valve 12 is controlled by a pneumatic proportional actuator 16.

A bubbler tube 18 having one end 20 immersed in the liquid contained in the tank 10 is mounted for selective immersion levels in the liquid in the tank 10.

The other end of the bubbler tube 18 is in fluid communication with the inlet 22 of a diaphragm amplifier 24, and a source 34 of pressure fluid through a conduit 36 and an associated restrictor 38. The source 34 of pressure fluid also communicates with a supply inlet 32 of the amplifier 24. It is understood that other elements can be used in place of the diaphragm amplifier such as a relay booster, ratio relay, or a pressure regulator, for example.

Figure 2:
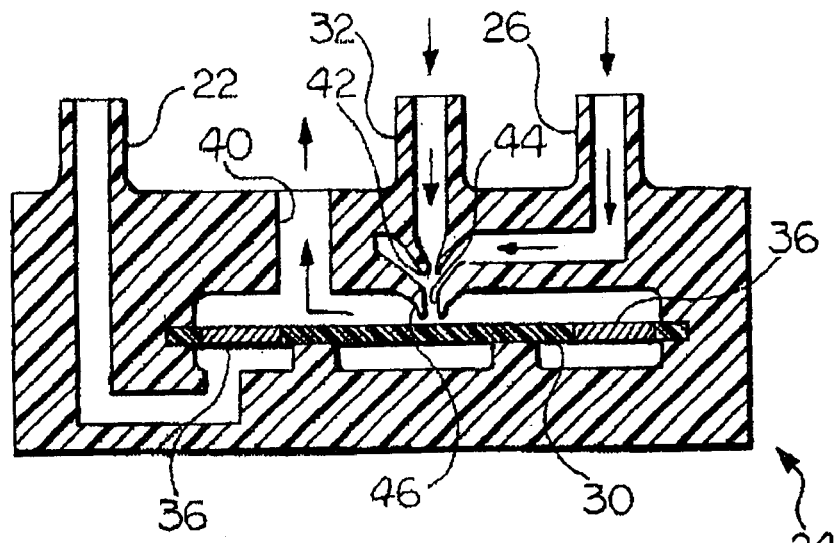
FIG. 2 is a sectional view of the pressure fluid amplifier illustrated in FIG. 1 wherein the amplifier is in a fully open mode.
Figure 3:
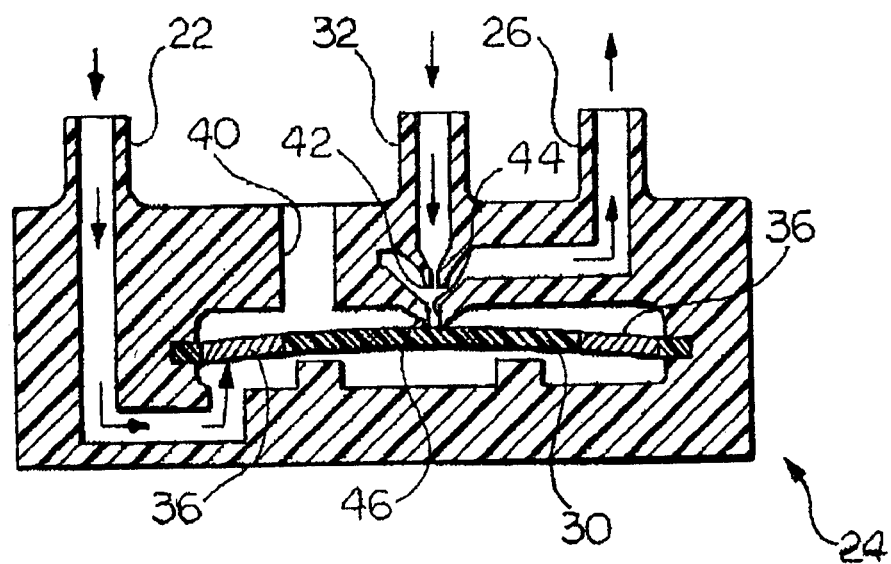
FIG. 3 is a sectional view of the pressure fluid amplifier illustrated in FIG. 2 showing the amplifier is in a fully open mode.

The diaphragm amplifier 24 is illustrated in section in FIGS. 2 and 3. The main body of the amplifier 24 may typically be formed of a plastic material, such as polysulfane, for example. A diaphragm 30 formed of a plastic material such as polyurethane, for example, with a flat web-type coil spring 36 formed of a suitable metal stock, as, for example, beryllium copper is disposed to extend across the hollow interior of the amplifier 24. The spring 36 disposed in the diaphragm 30 urges the diaphragm 30 towards a position to permit a flow of pressure fluid through the diaphragm amplifier 24.

The amplifier 24 is further provided with a vent 40 providing communication between atmosphere and the portion of the hollow interior of the diaphragm amplifier 24 above the diaphragm 30.

Also, as will be noted from an examination of FIGS. 2 and 3, the innermost end of the supply inlet 32 is provided with an outlet valve 42. Immediately below the outlet 42 is a septum 44 which terminates in a valve seat 46 in facing relation with the upper surface of the diaphragm 30.

In operation, for example, for maintaining a specific level in a tank, initially the diaphragm 30 is in the position illustrated in FIG. 2, there is no pressure in the outlet 26 and the line 28 illustrated in FIG. 1, leading to the valve actuator 16. Therefore, the valve 12 is normally open allowing the passage of liquid therethrough. As proportional changes in the level of the liquid in the tank 10 occur, the pressure in the bubbler tube 18 and the associated input control port 22 varies. These proportional changes cause the diaphragm 30 to proportionally flex from the position illustrated in FIG. 2 towards the positioning illustrated in FIG. 3. As illustrated in FIG. 3, the diaphragm 30 has been seated against the valve seat 46, thereby causing the flow of pressure fluid from the source 34 to flow through the supply inlet 32 and out of the amplifier 24 through the outlet 26 and the conduit 28 to the valve actuator 16. The actuator 16 is caused to completely close the valve 12 militating against the passage of liquid into the tank 10 through pipe 14. When the liquid level in the tank 10 changes, the pressure in the bubbler tube 18 and associated inlet 22 is reduced allowing the diaphragm 30 to return to the position illustrated in FIG. 2. It is to be understood that in the condition illustrated in FIG. 2 the supply pressure fluid is admitted to the amplifier 24 through the inlet 32 and is caused to be vented to the atmosphere through the vent 40. Simultaneously slight reduction in the pressure in the outlet 26 caused by the Venturi effect caused by the flow of supply pressure fluid through the hollow interior of the amplifier 24 results in an equilibrium over the upper surface of the diaphragm 30. This equilibrium continues until a slight change, typically an increase in the pressure occurs in the bubbler tube 18 by an increase in the level of liquid in the tank 10.

It will be understood that the above described liquid level control system is capable of maintaining the liquid level in the tank 10 without the use of electrically operated sensors and associated circuit parameters. Using a pneumatic actuated diaphragm amplifier 24 in combination with a bubbler, a pneumatic valve actuator, and a standard mechanical valve, the level of the liquid in the tank 10 may be automatically maintained at a specified level. For example, a total pressure change of one (1) inch water column (0.039 p.s.i) on the bubbler tube 18 and input side of the amplifier 24 can provide analog changes to the main supply pressure inlet 32 and provides analog control to the actuator 16 for the valve 12 from 0–35 p.s.i. This is accomplished by changes in the input pressure created in the bubbler tube 18 which in turn modulates the diaphragm 30 in the amplifier 24 to open or close the supply of pressure fluid to the valve actuator 16.

In accordance with the provisions of the patent statutes, the present invention has been described in what is considered to represent its preferred embodiment. However, it should be understood that the invention can be practiced otherwise than as specifically illustrated and described without departing from its spirit or scope.

What is claimed is:

1. A liquid level control system comprising:
   a tank;
   a source of liquid in communication with said tank;
   a pressure fluid actuated valve for controlling the flow of liquid to said tank from said source;
   a hydrostatic pressure sensor disposed in said tank, said pressure sensor including a conduit having one end submersed in the liquid in said tank;
   a source of pressure fluid; and a pressure fluid amplifier having separate connections for each of a pressure fluid outlet coupled to the pressure fluid actuated valve for controlling the flow of liquid from said source of liquid, a first inlet coupled to said source of pressure fluid, and a second inlet in communication with an other end of the conduit of said sensor, said amplifier including a proportional sensor for providing selective communication between the source of pressure fluid and said pressure fluid actuated valve, the proportional sensor directly responsive to proportional changes in pressure within said amplifier due to one of a flow of pressure fluid in said amplifier and a level of liquid in said tank, wherein a predetermined level of liquid attained in said tank is determined by a flexibility of the proportional sensor.

2. A liquid level control system as defined in claim 1 wherein the proportional sensor is a diaphragm.

3. A liquid level control system as defined in claim 2 wherein the diaphragm of said amplifier includes two opposing surfaces.

4. A liquid level control system as defined in claim 3 wherein the pressure fluid outlet and the first inlet of said amplifier communicate with a surface of the diaphragm of said amplifier.

5. A liquid level control system as defined in claim 4 wherein the second inlet of said amplifier communicates with an opposite surface of the diaphragm of said amplifier.

6. A liquid level control system as defined in claim 5 wherein the first inlet of said amplifier includes an outlet for admitting pressure fluid into said amplifier.

7. A liquid level control system as defined in claim 6 wherein the diaphragm of said amplifier includes a metal spring.

8. A liquid level control system as defined in claim 4 wherein said amplifier includes a vent.

9. A liquid level control system as defined in claim 8 wherein said source of pressure fluid is normally in fluid communication with the vent of said amplifier through the first inlet of said amplifier.

10. A liquid level control system comprising:
    a tank;
    a source of liquid in communication with said tank;
    a pressure fluid actuated valve for controlling the flow of liquid to said tank from said source;
    a hydrostatic pressure sensor disposed in said tank, said pressure sensor including a conduit having one end submersed in the liquid in said tank;
    a source of pressure fluid; and
    a pressure fluid amplifier having a pressure fluid outlet coupled to the pressure fluid actuated valve for controlling the flow of liquid from said source of liquid, a first inlet coupled to said source of pressure fluid, a second inlet in communication with an other end of the conduit of said sensor, a vent, and a proportional sensor for providing selective communication between the source of pressure fluid and the vent to cause an actuation of said valve, wherein
    proportional changes in a level of liquid in said tank and flow of pressure fluid in said amplifier adjacent the proportional sensor causes proportional flexing of the proportional sensor.

11. A liquid level control system as defined in claim 10 wherein said source of pressure fluid is normally in fluid communication with the vent of said amplifier through the first inlet of said amplifier.

12. A liquid level control system as defined in claim 10 wherein the proportional sensor is a diaphragm.

13. A liquid level control system as defined in claim 12 wherein the diaphragm of said amplifier includes two opposing surfaces.

14. A liquid level control system as defined in claim 13 wherein the pressure fluid outlet and the first inlet of said amplifier communicate with a surface of the diaphragm of said amplifier.

15. A liquid level control system as defined in claim 14 wherein the second inlet of said amplifier communicates with an opposite surface of the diaphragm of said amplifier.

16. A liquid level control system as defined in claim 10 wherein the first inlet of said amplifier includes an outlet for admitting pressure fluid into said amplifier.

17. A liquid level control system as defined in claim 12 wherein the diaphragm of said amplifier includes a metal spring.

18. A liquid level control system as defined in claim 10 wherein said amplifier has separate connections for each of the pressure fluid outlet, the first inlet, and the second inlet.

19. A liquid level control system comprising:

a tank;

a source of liquid in communication with said tank;

a pressure fluid actuated valve for controlling the flow of liquid to said tank from said source;

a hydrostatic pressure sensor disposed in said tank, said pressure sensor including a conduit having one end submersed in the liquid in said tank;

a source of pressure fluid; and a pressure fluid amplifier having a pressure fluid outlet coupled to the pressure fluid actuated valve for controlling the flow of liquid from said source of liquid, a first inlet coupled to said source of pressure fluid, a second inlet in communication with an other end of the conduit of said sensor, and a proportional sensor for providing selective actuation of said valve, wherein the pressure fluid outlet and the first inlet of said amplifier communicate with a surface of the proportional sensor of said amplifier, and the second inlet of said amplifier communicates with an opposite surface of the proportional sensor of said amplifier, wherein proportional changes in a level of liquid in said tank and flow of pressure fluid in said amplifier adjacent the proportional sensor cause proportional flexing of the proportional sensor.

20. A liquid level control system as defined in claim 19 wherein the proportional sensor includes a spring disposed therein to urge said sensor towards a position to permit flow of pressure fluid through said amplifier.

* * * * *